Nov. 16, 1948.	A. M. MAYO	2,453,923
AIRCRAFT COOLING BY AIR TURBINE MEANS
Filed Aug. 20, 1946

INVENTOR.
ALFRED M. MAYO
BY
J. Edwin Coates
ATTORNEY

Patented Nov. 16, 1948

2,453,923

UNITED STATES PATENT OFFICE 2,453,923

AIRCRAFT COOLING BY AIR TURBINE MEANS

Alfred M. Mayo, Los Angeles, Calif., assignor to Douglas Aircraft Company, Inc., Santa Monica, Calif.

Application August 20, 1946, Serial No. 691,678

18 Claims. (Cl. 62—136)

This invention relates to a system for cooling compartments of aircraft and particularly high speed aircraft subject to a large degree of kinetic or aerodynamic heating resulting from the ram effect which occurs upon change in velocity of the airstream or from friction of the airstream over the fuselage of the aircraft.

As long as the ambient air temperature is low enough it is theoretically possible to cool aircraft compartments and dissipate heat gained from radiant solar energy, power plants and other heat producing equipment of the aircraft by merely increasing the ventilation air flow through the compartment. A practical limitation even in this case becomes evident, however, when the ventilation flow in a given size of aircraft compartment reaches such a velocity as to become obnoxious to flight personnel before the required rate of heat removal is obtained. When the aircraft is subject to high ambient air temperature or a large degree of kinetic heating derived from adiabatic compression of air rammed into the airplane or the surface boundary layer thereof, a ventilation system cooled only by ambient air is entirely inadequate.

Air cycle refrigeration systems dependent upon a source of compressed air which have been heretofore used to cool the air within aircraft compartments, are objectionable in certain high speed aircraft in which a suitable source of compressed air is not available. The addition of a suitable source increases the weight of the aircraft, and this in combination with the basically low coefficient of performance of such systems which decreases rapidly with increase of speed of the aircraft, constitute a most important limitation on this type of system for very high speed aircraft.

The system of the present invention utilizes ram air from forward velocity of the aircraft in flight as a source of compressed air and thus does not require a separate compressor. The system of the present invention comprises essentially a ram duct, a turbine, a heat exchanger, and a compressor. An efficient scoop directs ram air into the turbine which extracts energy therefrom and by substantially adiabatic expansion lowers the temperature and pressure of the air passing therethrough. This air is then directed through the heat exchanger and compressor after which it is discharged overboard. The compressor and turbine are carried by a single shaft to the end that the mechanical energy extracted by the turbine is used to drive the compressor. In short, a portion of the potential energy of the ram air is extracted in the form of mechanical energy and in that form via a shaft simply bypasses the heat exchanger to be later reapplied on the compressor. The air to be introduced into the compartment is also taken from ram and is passed through the opposite side of the heat exchanger therein being cooled at substantially constant pressure by the air expanded in the turbine.

In one embodiment of the invention herein disclosed mechanical energy extracted by the turbine is used to drive a compressor for compressing the air delivered into the compartment to the end that the pressure of the air within the compartment can be maintained at a value above ambient flight pressure through some suitable pressure control.

It should now be seen that the system of the present invention is independent of any other aircraft component or accessory and all the energy required to operate the system is extracted directly from the ram air. As the system produces a temperature depression from substantially adiabatic expansion in the turbine which increases directly with the kinetic heating temperature increase associated with the increase of speed, it affords a very simple efficient system for cooling the compartments of high speed aircraft.

Other features and advantages will be apparent from the following description, taken in connection with the accompanying drawing in which.

Figure 1:
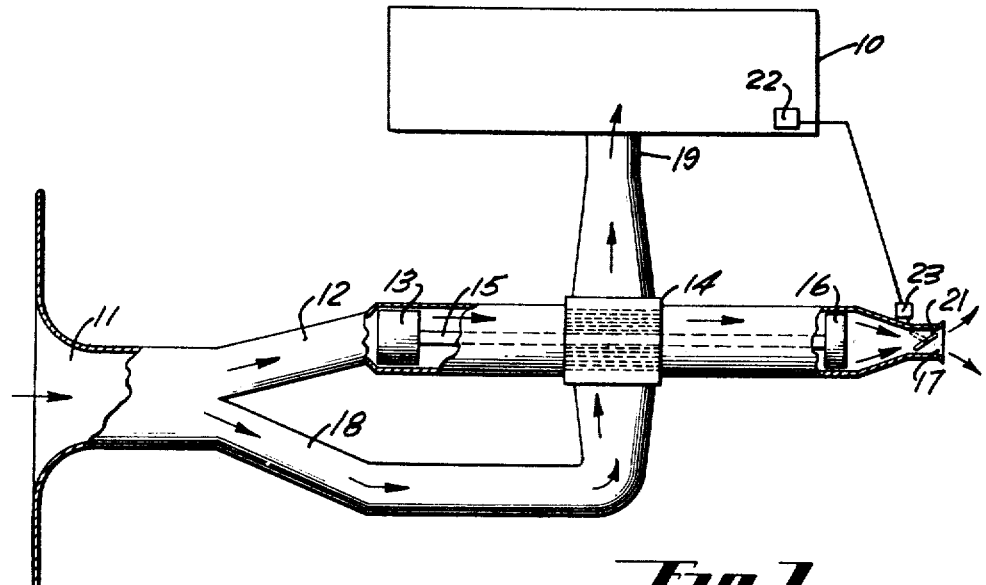
Figure 1 is a diagrammatic view of one embodiment of the present invention.

In the embodiment of the present invention illustrated in Figure 1 the compartment to be cooled is shown at 10 and may comprise any compartment within the aircraft the temperature of which is desired to be regulated. Air is supplied to the compartment 10 through a ram duct 11 and a portion of the ram air is directed through a duct 12 in which is mounted an air cycle expansion turbine 13. The air after it emerges from the turbine 13 has a temperature substantially less than that of the ram air and is passed through a heat exchanger diagrammatically shown at 14. The turbine 13 is mounted on and drives a shaft 15 to which is mounted at the opposite end thereof a compressor 16. The compressor, as should be understood, decreases the pressure of the air downstream from the turbine and thus increases the pressure drop across the turbine as well as the rate of flow of air through the same. The air is delivered by the compressor to an outlet duct 17 for discharge to the ambient air.

A portion of the ram air entering through the ram inlet 11 enters a duct 18 leading to the heat exchanger 14 and is consequently reduced in temperature in passing therethrough prior to its introduction into the compartment 10 through the inlet duct 19. Although a single large ram inlet is shown obviously a separate ram may be provided for the duct 18 leading to the heat exchanger 14.

The temperature of the air introduced into the compartment 10 can be regulated by varying the air passing through the turbine 13. To this end the discharge duct 17 carries a valve 21 the position of which is controlled by some suitable temperature responsive means 22 mounted within the compartment 10 and connected to a valve operating mechanism 23 located adjacent the valve 21. As should be understood, regulation of the valve 21 to increase or decrease the flow of air through the turbine 13 will, by varying the temperature of the air passing through the one side of the heat exchanger 14, correspondingly vary the temperature of the air passed through the other side of the heat exchanger prior to its introduction into the compartment 10.

Figure 2:
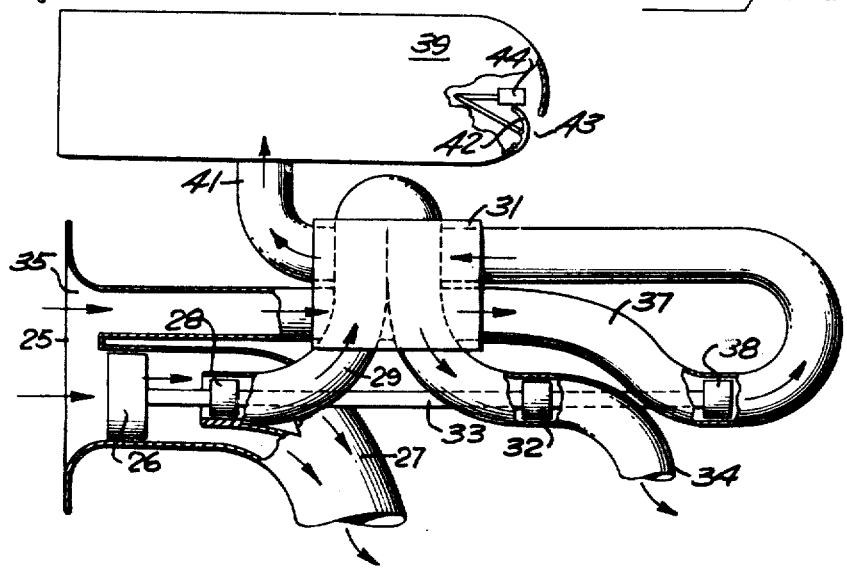
Figure 2 is a view similar to Figure 1 but showing a modified form of the present invention.

In the embodiment of the invention shown in Figure 2, air taken in through the ram inlet 25 is passed into and through an expansion turbine 26. A portion of the air passed through the turbine 26 is discharged overboard through a discharge conduit 27 while the remainder of this ram air is directed into a second turbine 28 mounted at the entrance of a duct 29. The ram air passed through the turbine 28 is carried by the duct 29 through a heat exchanger 31. The flow of air through the heat exchanger 31 is augmented by a compressor 32 mounted on a shaft 33 driven by the turbines 26 and 28. The air which has now suffered a fall of pressure and temperature, is passed through the interchanger 31 and is delivered by the compressor 32 to a conduit 34 leading to the ambient atmosphere.

Ram air entering through a second ram inlet 35 is led through a conduit 37 to the heat exchanger 31 to dissipate a part of the heat contained therein, and from the intercooler to a second compressor 38 also mounted on the shaft 33 and driven by the energy derived from the air passed into the turbines 26 and 28. The compressor 38 substantially adiabatically increases the pressure of the air and forces the same again through the heat exchanger 31 before it is introduced into the compartment 39 through a suitable inlet duct 41. Although the compression of the air will increase the temperature of the same this heat is substantially reduced by the passage of the compressed air through the heat exchanger prior to its introduction into the compartment 39.

The shaft 33 is passed through the walls of the conduits 29 and 37 by means of suitable seals mounted in the openings formed in the walls of the conduits. Any type of seal desired can be used so long as it prevents the loss of air through the walls at the openings.

The compressor 38 in this form of the invention serves as a means for furnishing air under pressure to the compartment 39 to the end that the absolute pressure within the compartment 39 can be maintained at a value in excess of the ambient absolute pressure. The absolute pressure within the compartment 39 can be controlled through a suitable valve 42 the position of which relative to a discharge opening 43 is controlled by means of a pressure sensitive regulatory means 44 mounted within the compartment 39. In other words, as the rate of flow of air from the compartment through the discharge opening 43 can be varied by changing the position of the valve 42, the pressure within the compartment can be correspondingly varied.

Here, as in the earlier described embodiment of the invention, a portion of the potential energy contained by the ram air is transformed by the turbines to mechanical energy and in that form bypasses the heat exchanger 31. As should be understood, the pressure drop across the turbines will be a function of the combined performance of the turbines and the compressor 32, and care should be taken to select the turbines and compressor 32 which will bring about the temperature reduction desired.

Although not shown, gearing may be used to maintain optimum relationship for best efficiency of the diameter and tip speeds of the turbines and the compressors driven thereby. To eliminate gearing between the compressors 32 and 38, the compressor 32 might be of axial type while the compressor 38 could be of radial type.

It will be seen that both forms of the invention illustrated will provide a means for ventilating and cooling aircraft compartments without resorting to means for furnishing compressed air and thus eliminates the weight of accessories necessary to furnish such supply of compressed air. As the system is not dependent upon any other aircraft component or accessory, the system will function even though the power source fails. The cooling effect of the present invention increases directly with the temperature increase associated with increased speed of the aircraft and consequently is well adapted for use in those aircraft having speeds approximating that of sound or higher.

Although the now preferred embodiments of the invention have been shown and described herein, it is to be understood that the invention is not to be limited thereto for the invention is susceptible to changes in form and detail within the scope of the appended claims.

I claim:

1. A system for cooling the air within an aircraft compartment, comprising: a ram inlet; means for converting energy of said ram air into mechanical energy; heat exchanging means receiving the air cooled by said last named means; a compressor for increasing the flow of air into said inlet; means for transmitting said mechanical energy to said compressor to drive the same; and duct means leading from the atmosphere through said heat exchanging means to said compartment.

2. A system for cooling the air within an aircraft compartment, comprising: a ram inlet; a turbine arranged in said ram inlet; a heat exchanger through which the air cooled by expansion through the turbine is directed; compressor means adapted to be driven by said turbine for increasing the flow of air through said turbine; means for leading ram air through said heat exchanger to be cooled thereby; and means for conducting the air cooled by passage through said heat exchanger to said compartment.

3. A system for cooling the air within an aircraft compartment, comprising: a source of ram air; turbine means for expanding said ram air to reduce the temperature thereof; means for conducting ram air to said compartment; heat exchanging means mounted in said conducting means through which air cooled by said expansion passes to thereby reduce the temperature of the air conducted to said compartment; and means driven by said turbine means for increasing the rate of flow of air through said turbine means.

4. A system for cooling the air within an aircraft compartment, comprising: a ram inlet; a duct for receiving ram air from said inlet; a turbine arranged in said duct; a heat exchanger carried by said duct through which the air cooled by expansion through the turbine is directed; compressor means mounted in said duct downstream from said heat exchanger for augmenting the flow of air through said duct; means for leading ram air through said heat exchanger in heat exchanging relationship with the air cooled by expansion through said turbine; and conduit means for leading the cooled air from said heat exchanger to said compartment.

5. A system for cooling the air within an aircraft compartment, comprising: a ram inlet; duct means leading from said inlet to the atmosphere; a turbine arranged in said duct means; compressor means mounted in said duct means adapted to be driven by said turbine to increase the flow of air therethrough; a heat exchanger disposed in said duct means intermediate said turbine and compressor through which the air cooled by expansion through the turbine is directed; means for leading ram air through said heat exchanger; and conduit means leading from said heat exchanger to said compartment.

6. A system for controlling the temperature of the air within an aircraft compartment, comprising: a ram inlet; a turbine arranged in said ram inlet; a heat exchanger through which the air cooled by expansion through the turbine is directed; compressor means adapted to be driven by said turbine for increasing the flow of air through said turbine; means for leading ram air through said heat exchanger to be cooled thereby; means for conducting the air cooled by passage through said heat exchanger to said compartment; means for varying the amount of air passed through said turbine; and means responsive to the temperature of the air within said compartment for controlling said varying means.

7. A system for controlling the temperature and pressure of the air within an aircraft compartment, comprising: a source of ram air; turbine means for expanding said ram air to reduce the temperature thereof; means for conducting ram air to said compartment; heat exchanging means mounted in said conducting means through which air cooled by said expansion passes to thereby reduce the temperature of the air conducted to said compartment; means driven by said turbine means for increasing the rate of flow of air through said turbine means; and means, separate from said last named means, driven by said turbine means for increasing the pressure of the air furnished said compartment by said conducting means.

8. A system for controlling the pressure and temperature of the air within an aircraft compartment, comprising: a ram inlet; turbine means arranged in said ram inlet; a heat exchanger through which the air cooled by expansion through the turbine means is directed; compressor means adapted to be driven by said turbine means for increasing the flow of air through said turbine means to the ambient atmosphere; means for leading additional ram air through said heat exchanger to be cooled thereby; means for conducting the air cooled by said heat exchanger to said compartment; and a second compressor driven by said turbine means mounted in said conducting means whereby the cooled air furnished said compartment is under a pressure greater than that of ambient air.

9. A system for controlling the temperature and pressure of the air within an aircraft compartment, comprising: a ram inlet; turbine means arranged in said ram inlet; compressor means adapted to be driven by said turbine means; a heat exchanger through which the air cooled by expansion through the turbine is directed; means for leading additional ram air through said heat exchanger to be cooled thereby; a second compressor means; means for conducting air cooled by passage through said heat exchanger to said second compressor means; and conduit means leading from said second compressor means through said heat exchanger to said compartment.

10. A system for controlling the pressure and temperature of the air within an aircraft compartment, comprising: a ram inlet; a duct for receiving ram air from said inlet; turbine means arranged in said duct; a heat exchanger carried by said duct through which the air cooled by expansion through the turbine means is directed; compressor means mounted in said duct downstream from said heat exchanger for augmenting the flow of air through said duct; a second ram inlet; means for conducting ram air from said last named inlet through said heat exchanger in heat exchanging relationship with the air cooled by expansion through said turbine means; a second compressor mounted in said conducting means and driven by said turbine means; and conduit means leading from said last named compressor through said heat exchanger to said compartment.

11. A system for regulating the temperature of the air within an aircraft compartment, comprising: a ram inlet; duct means leading from said inlet to the atmosphere; a turbine arranged in said duct means; compressor means mounted in said duct means adapted to be driven by said turbine to increase the flow of air therethrough; a heat exchanger disposed in said duct means intermediate said turbine and compressor through which the air cooled by expansion through the turbine is directed; means for leading ram air through said heat exchanger; conduit means leading from said heat exchanger to said compartment; means for varying the amount of air passed through said turbine; and means responsive to the temperature of the air within said compartment for controlling said varying means.

12. A system for controlling the temperature and pressure of the air within an aircraft compartment, comprising: a ram inlet; a duct for conducting ram air from said inlet to the ambient atmosphere; a turbine arranged in said duct; a heat exchanger carried by said duct through which the air cooled by expansion through the turbine is directed; compressor means mounted in said duct downstream from said heat exchanger for augmenting the flow of air through said duct; a second ram inlet; means for leading ram air from said second inlet through said heat exchanger in heat exchanging relationship with the air cooled by expansion through said turbine to said compartment; and compressor means in said last named means for compressing the air cooled by passing through said interchanger prior to its introduction into said compartment.

13. A system for controlling the pressure and temperature of the air within an aircraft compartment, comprising: a ram inlet; a duct for receiving ram air from said inlet; turbine means arranged in said duct; a heat exchanger carried by said duct through which the air cooled by expansion through the turbine means is directed; compressor means driven by said turbine means and mounted in said duct downstream from said heat exchanger for augmenting the flow of air through said duct; means for leading ram air through said heat exchanger in heat exchanging relationship with the air cooled by expansion through said turbine means; conduit means leading from said heat exchanger to said compartment for conducting said cooled air thereto; and a second compressor means driven by said turbine means, said second compressor being mounted in said conduit means for furnishing air under pressure to said compartment.

14. A system for controlling the temperature of the air within an aircraft compartment, comprising: a ram inlet; means for converting energy contained by the air entering said ram inlet into mechanical energy; heat exchanging means receiving the air cooled by said last named means; a compressor for increasing the flow of air into said inlet; means for transmitting said mechanical energy to said compressor to drive the same; duct means leading from the atmosphere through said heat exchanging means to said compartment whereby the temperature of the air entering said compartment is reduced by the heat absorbed by the air cooled by said converting means; and means, including means for varying the rate of flow of air through said converting means, for varying the temperature of the air within said compartment.

15. The method of reducing the temperature of air supplied to a compartment of an aircraft comprising the steps of: extracting energy from ram air by substantially adiabatically expanding said air to lower the temperature thereof; passing said expanded air through a heat exchanging means in heat receiving relationship with ventilation air prior to its introduction into said compartment; and utilizing the energy extracted from said ram air to increase the expansion of said ram air.

16. The method of reducing the temperature of air supplied to a compartment of an aircraft comprising the steps of: extracting energy from ram air by substantially adiabatically expanding said air by passing the same through an expansion turbine to lower the temperature of said air; passing said expanded air through a heat exchanging means in heat receiving relationship with ventilation air to be supplied to said compartment; introducing said cooled ventilation air to said compartment; and driving an air moving means by the energy extracted from said air to increase the rate of flow of air through said turbine.

17. The method of reducing the temperature of air supplied to a compartment of an aircraft comprising the steps of: extracting energy from ram air by substantially adiabatically expanding said air to lower the temperature thereof; passing said expanded air through a heat exchanging means in heat receiving relationship with ventilation air prior to its introduction into said compartment; utilizing a portion of the energy extracted from said ram air to increase the expansion of said ram air; and using the remainder of said energy to compress the ventilation air supplied to said compartment.

18. The method of reducing the temperature of air supplied to a compartment of an aircraft comprising the steps of: extracting energy from ram air by substantially adiabatically expanding said air to lower the temperature thereof; passing said expanded air through a heat exchanging means in heat receiving relationship with ventilation air prior to its introduction into said compartment; utilizing the energy extracted from said ram air to increase the expansion of said ram air; and varying the flow of said expanded air through said heat exchanging means to vary the extraction of the heat from said ventilation air and thus control the temperature of said ventilation air introduced into said compartment.

ALFRED M. MAYO.

No references cited.